(No Model.) 2 Sheets—Sheet 1.
F. J. NOECHEL.
SLED PROPELLER.
No. 438,819. Patented Oct. 21, 1890.
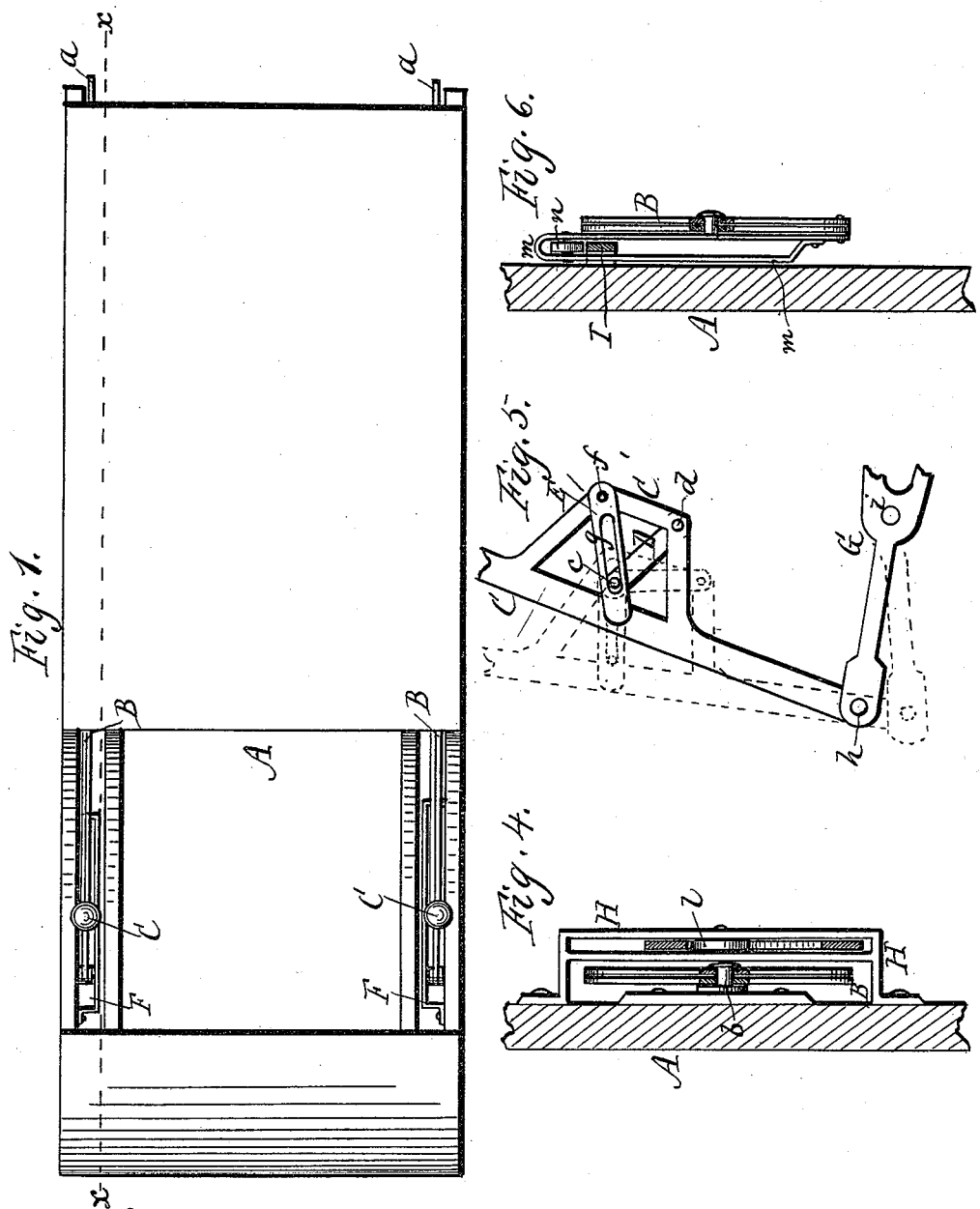
Witnesses.
E. N. Adams
P. W. Costick
Inventor.
Frank J. Noechel,
R. F. Osgood,
Atty.

(No Model.) 2 Sheets—Sheet 2.
F. J. NOECHEL.
SLED PROPELLER.
No. 438,819. Patented Oct. 21, 1890.
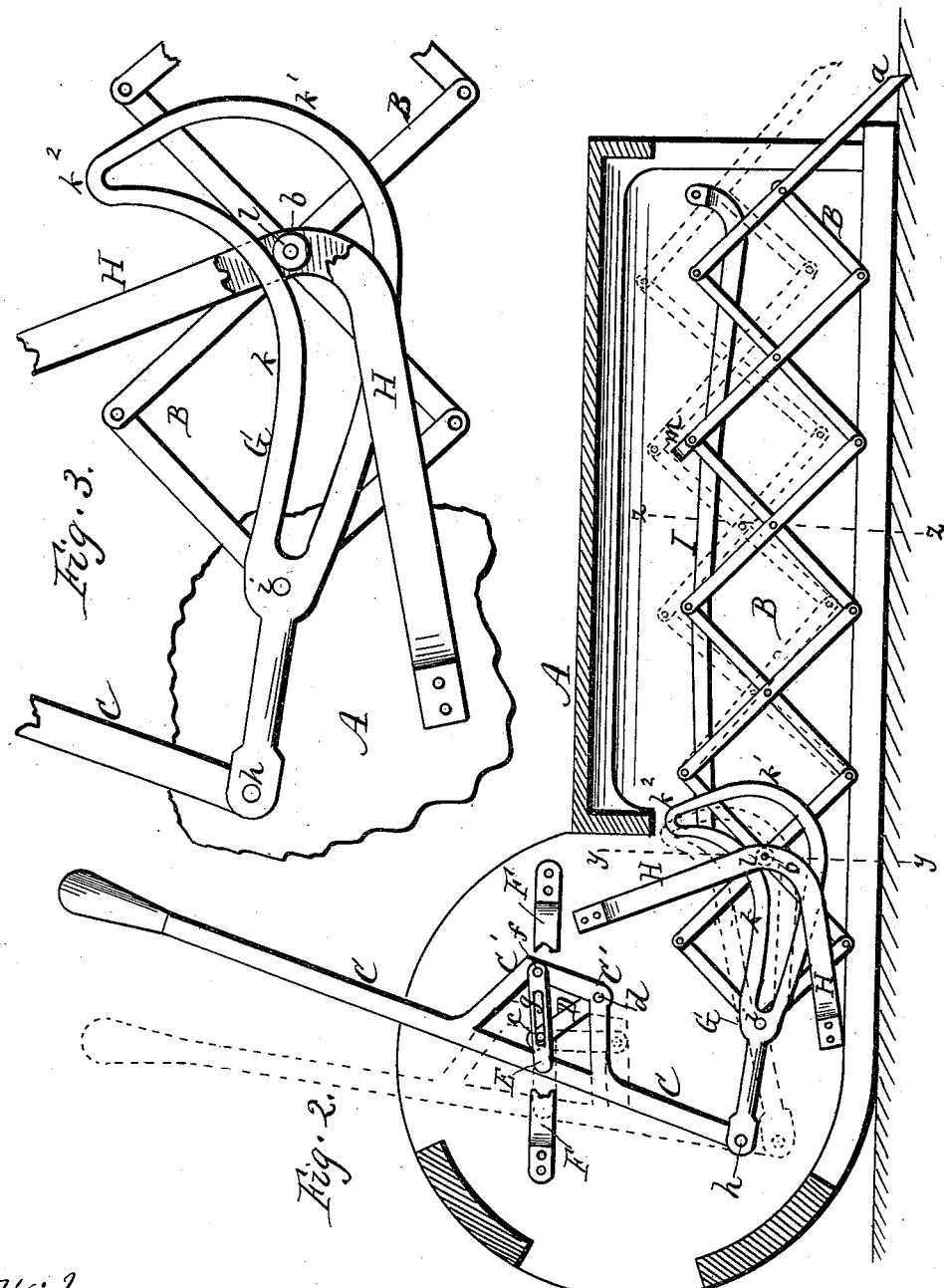
Witnesses.
E. N. Adams
P. H. Cevrich
Inventor.
Frank J. Noechel,
R. F. Osgood,
Atty.

UNITED STATES PATENT OFFICE.

FRANK J. NOECHEL, OF ROCHESTER, NEW YORK.

SLED-PROPELLER.

SPECIFICATION forming part of Letters Patent No. 438,819, dated October 21, 1890.

Application filed April 3, 1890. Serial No. 346,486. (No model.)

*To all whom it may concern:*

Be it known that I, FRANK J. NOECHEL, of Rochester, in the county of Monroe and State of New York, have invented a certain new and useful Improvement in Propelling Apparatus; and I do hereby declare that the following is a full, clear, and exact description of the same, reference being had to the drawings accompanying this application.

My improvement relates to that class of sleds propelled by a system of lever-work in the nature of "lazy-tongs" located on opposite sides and operated by handles.

The invention consists in means for holding the lever-work down while being extended and for holding it up while being retracted, as hereinafter described.

In the drawings, Figure 1 is a plan view of the sled. Fig. 2 is a longitudinal vertical section of the same in line $x$ $x$ of Fig. 1. Fig. 3 is a diagram showing an enlarged elevation of the front portion of the apparatus. Fig. 4 is an enlarged cross-section in line $y$ $y$ of Fig. 2. Fig. 5 is a diagram showing an enlarged side elevation of the handle and its connecting parts. Fig. 6 is an enlarged cross-section in line $z$ $z$ of Fig. 2.

A indicates the sled, which is of ordinary construction.

B indicates the system of jointed levers by which the sled is propelled. These levers are in the nature of lazy-tongs, being jointed together, as shown, and the rear lever being made longer than the others and provided at its lower end with a sharp-pointed spur $a$, which catches into the ice to propel the sled forward. A set of these levers is used on each side of the sled, and they stand upright or vertically against the inner sides of the runners. The levers are permanently pivoted to the side of the sled at $b$, the main portion of the lever-work being in the rear of the pivot and free of the sled, while a single section stands in advance of the pivot and serves as the attachment for the operating-handle.

C indicates the operating lever or handle standing upright at the front of the sled and in convenient position to be seized by the operator.

D is a link pivoted at $c$ to the side of the sled and at the other end to an offset $C'$ of the handle, as shown at $d$. The handle is not pivoted directly to the sled; but by being pivoted to the link and the link being pivoted to the sled the handle has a swinging movement as it is rocked forward and back, and receives a degree of vertical movement at each stroke, rising when drawn back to extend the levers and falling when thrown forward to retract the levers. This is indicated by the full and dotted lines in Fig. 2.

E is a gage-plate consisting of a link pivoted at $f$ to the offset $C'$ of the handle, the opposite end hanging free. This gage-plate is provided with a slot $g$, that plays over the fixed pivot $c$ of the link D. The gage-plate simply gages the throw of the handle in opposite directions, and by hanging free it allows the vertical rise and fall of the handle, as before described. The handle is retained in place by a guide-strap F, attached to the side of the sled.

G is a yoke pivoted at $h$ to the lower end of the handle C and at $i$ to the front ends of the lever-work B, which at that point meet at an apex and stand one section in advance of the permanent pivot $b$, that attaches the lever-work to the side of the sled. In the rear of pivot $i$ the yoke separates into two curved branches $k$ $k'$, which unite at the rear upper end, as shown at $k^2$. The branches are retained in place and guided by a guide-strap H, attached to the side of the sled, and this guide-strap is made in two coincident parts, between which is located a friction-roller $l$, resting between the two branches $k$ $k'$. This roller is independent of the lever-work B, which latter slides freely forward and back under the strap H.

I is a bar extending longitudinally, being attached to the sled near the top of the levers B. One of the levers B has an extension $m$, forming a loop, that extends up, over, and around the bar, embracing the same and provided with a friction-roller $n$, Fig. 6, which rests above the bar, the object of which will be presently described.

The operation is as follows: When the handle is drawn back to extend the lever-work, it is raised by reason of the swinging of link D on pivot $c$, and when thrown forward to retract the lever-work it is lowered by the swinging of the link in the opposite direction. The handle operates as a lever to correspondingly raise and lower the outer or rear end of the lever-work B by reason of the yoke G, pivoted to the lower end of the handle and to the lever-work in advance of its permanent pivot. Therefore in the back-stroke of the handle the lever-work will be thrown down to engage with the ice, and in the forward stroke it will be raised clear of the ice and retracted without coming in contact with the ice. The object of the branched ends $k\ k'$ of the yoke is to prevent too much rise and fall of the lever-work B. This is accomplished by the opposite branches striking and riding on the friction-roller $l$. The upper branch strikes on top of the roller when the lever-work goes back and prevents the spur at the rear going beyond a given depth, which is necessary in passing over holes and depressions to obviate irregular action. The lower branch strikes under the roller and prevents undue rise of the lever-work in being retracted. The apparatus would be operative without the use of the branches on the yoke; but these branches are desirable under ordinary circumstances. The full lines in Fig. 2 show the lever-work thrown about half-way back. At the end of the back-stroke the friction-roller $n$, attached to the extension $m$, strikes on top of the bar I and raises the spur $a$ from the ice. This prevents unnecessary labor of the operator, as the spur sometimes holds with considerable tenacity.

The apparatus above described is equally applicable to wheeled vehicles; also to boats by using a paddle instead of a spur at the rear.

Having described my invention, what I claim as new is—

1. The combination of the lever-work pivoted to the body of the vehicle, the handle pivoted to a swinging link, so as to have a degree of vertical movement when moved forward and back, and the yoke pivoted to the lower end of the handle and to the end of the lever-work in advance of its permanent pivot, whereby the rear end of the lever-work will be raised and lowered with the rocking of the handle, as herein shown and described.

2. The combination of the lever-work pivoted to the body of the vehicle, the handle pivoted to a swinging link, so as to have a degree of vertical movement when moved forward and back, the yoke pivoted to the lower end of the handle and to the end of the lever-work in advance of its permanent pivot, said yoke constructed with branches forming a loop, and a fricton-roller between the branches and against which the branches strike to limit the upward and downward throw of the lever-work when operated by the handle, as herein shown and described.

3. The combination, with the jointed lever-work, of an extension consisting of a loop attached thereto and a longitudinal bar which the loop embraces, the loop striking the bar at the end of the throw of the lever-work and serving to raise the lever-work from contact with the ground, as herein shown and described.

In witness whereof I have hereunto signed my name in the presence of two subscribing witnesses.

FRANK J. NOECHEL.

Witnesses:
R. F. OSGOOD,
WM. J. MCPHERSON.